(12) United States Patent
Gouvêa et al.

(10) Patent No.: US 6,954,189 B1
(45) Date of Patent: Oct. 11, 2005

(54) MATRIX ANALOG SYSTEM FOR THE REPRODUCTION OF IMAGES

(75) Inventors: Nereu Gouvêa, Paranaguá (BR);
Ronaldo Tramujas, Paranaguá (BR);
Ricardo Tramujas, Paranaguá (BR)

(73) Assignee: Nereu Gouvea, Paranagua/PR (BR)

( * ) Notice: Subject to any disclaimer, the term of this patent is extended or adjusted under 35 U.S.C. 154(b) by 0 days.

(21) Appl. No.: 09/762,876

(22) PCT Filed: Jun. 17, 1999

(86) PCT No.: PCT/BR99/00047

§ 371 (c)(1),
(2), (4) Date: Jun. 11, 2001

(87) PCT Pub. No.: WO00/10319

PCT Pub. Date: Feb. 24, 2000

(30) Foreign Application Priority Data

Aug. 11, 1998 (BR) .................................. 9802700
May 17, 1999 (BR) ............................... 7901399 U

(51) Int. Cl.⁷ .............................................. G09G 3/30
(52) U.S. Cl. .............................. 345/76; 345/55; 345/82
(58) Field of Search .............................. 345/55, 82–83, 345/39, 46, 76

(56) References Cited

U.S. PATENT DOCUMENTS

| 5,170,158 A | 12/1992 | Shinya .......................... 345/98 |
| 5,739,803 A | 4/1998 | Neugebauer ................. 340/800 |
| 5,784,073 A | 7/1998 | Yamazaki et al. ........... 345/511 |
| 5,786,795 A * | 7/1998 | Kishino et al. ................ 345/74 |
| 6,031,328 A * | 2/2000 | Nakamoto .................... 313/495 |
| 6,140,983 A * | 10/2000 | Quanrud ........................ 345/55 |
| 6,278,425 B1 * | 8/2001 | DeLuca ......................... 345/84 |
| 6,414,249 B1 * | 7/2002 | Vickers ....................... 174/261 |

FOREIGN PATENT DOCUMENTS

WO    WO 95/20210    7/1995

* cited by examiner

*Primary Examiner*—Alexander Eisen
*Assistant Examiner*—Kimnhung Nguyen
(74) *Attorney, Agent, or Firm*—Kinney & Lange, P.A.

(57) ABSTRACT

Matrix analog system for the reproduction of images characterised for presenting an electronic command system for matrixes for the reproduction of video images in real time by means of pixels in a way that the image displayed by the matrix had analog attitude and characteristics and that do not depend on previous processing of the video signal through analog/digital or digital/analog converters, without the need for microprocessors, digital memories, shift registers or even computers and converters which are normally needed so that images could be generated on a pixel matrix. Presents variations that define the means for the building of pixel matrixes that do not have the characteristic of emitting light while not powered (LED's, lamps and similar devices) and means for the building of a photoluminescent matrix to allow the reproduction of colour images. Presents the addition of two grids for an improved brightness of the phosphorus.

6 Claims, 3 Drawing Sheets

MATRIX ANALOG SYSTEM FOR THE REPRODUCTION OF IMAGES

BACKGROUND OF THE INVENTION

This invention patent refers to an electronic system developed so as to command a matrix for the reproduction of video images in real time through pixels (image elements) in a way that the image reproduced on the matrix has the same advantages and the same attitude of the conventional cathodic ray tubes that is it may display composite video images in real time without the previous processing of analog/digital or digital/analog converters, without the need for microprocessors, digital memories, shift registers or even computers and converters which are normally needed so that images could be generated on a pixel matrix.

The display of information under the form of dynamic image when this is obtained by means of electronic reception or storage has been performed with a device called kinescope for more than 70 years.

The kinescope is a glass device with thick walls, large dimensions and heavy, able to stand the external pressures once there is vacuum inside; the basic principle is to reproduce an image by means of an electron beam that sweeps a screen embedded with phosphorus oxide and other elements, producing light during a time lapse according to the speed and quantity of electrons that hit the mentioned screen. The beam sweeping is controlled electrically or magnetically and is obtained by means of external analog devices, it is also necessary a high voltage producing device (approximately 25,000 volts) to accelerate the electrons inside the tube. Even though all the technology developed and available all over the world, it has not yet been possible to produce a device that could substitute the kinescope for television sets and/or computer monitors with the same image quality, cost and performance.

This is due mainly because inside the kinescope the image is generated analogically, the image resolution is not limited by a fixed number of pixels and/or light intensity once the resolution and image quality depend on the passing band of the circuit through which the video signal is transmitted rather than the kinescope itself as an image reproduction element. Cathodic ray kinescopes present the inconvenience of the size limit due to the need of very high tension to be generated (the larger the kinescope the higher the tension needed) and due to image convergence difficulties. In the last 70 years, because of these reasons commercially speaking, the size of kinescopes did not go much beyond 37" diagonally.

However, with the advent of liquid crystals and advances in the development of photoluminescent displays and associated technologies, we have nowadays computer monitors and even television sets of very light weight that consume less energy and are competitively priced. Yet when we talk about image quality we must consider what is the objective, for instance if we talk about a PC which display image is in general static and with a defined number of pixels and light hues, generally 16, 32, 256, etc. there is no problem, but when we speak about televisions with 100% dynamic images producing around 60 frames per second and with a resolution that changes constantly needing moreover a viewing angle of 120° it is totally different; limitations regarding transmission speed due to digitalisation of the image, level of luminosity and narrow viewing angle are a great disadvantage, the latter almost discards the production of large dimension liquid crystal monitors in substitution of kinescopes in commercial television sets.

There is another kind of monitor utilising LED's (light emitting diodes), these generally of large dimensions, destined to be used as electronic outdoor billboards for publicity (also called electronic panels) the working principle is very much the same of the liquid crystal one, the Principle of Image Digitalisation; according to this principle any image or drawing that we wish to display may be digitally recorded or converted like computers that use the binary 100101 to represent the number 37, we may use the same binary 100101 to represent a colour or a light intensity onto a determined point of the display that has its moment authorised by the matrix coordinates in a logical and precise manner. Thus the image is always static and previously known.

SUMMARY OF THE INVENTION

The "MATRIX ANALOG SYSTEM FOR THE REPRODUCTION OF IMAGES" is not a new "type of monitor", but a new way of control configuration for matrixes that when applied to LED matrixes or even to the principle of cathodic ray kinescopes (photoluminescent matrix) would considerably improve performance of these.

As an example, it would be enough to use the "MATRIX ANALOG SYSTEM FOR THE REPRODUCTION OF IMAGES" together with the principle of photoluminescence already widely used on electronic equipment in general as a result of which the weight of cathodic ray kinescopes, specially the largest ones, would become eight tenths, it would not be necessary to have external circuits for the generation of high tension, deflecting coils or others that will rise the final price of the product or even the difficulty of manufacturing 100", 200" or more diagonally and even then the thickness of the monitor would be practically the same, like of a picture frame on the wall, correspondingly to photoluminescent displays.

For an improved phosphorus brightness it is presented in this patent the inclusion of a further sequence of grids so as to build a matrix together with the existing grids and the common connection of all the anodes or unique anode o apply a higher fixed voltage, and on this the phosphorus may be laid onto, either monochromatic or polychromatic.

I would not be necessary to digitise the image for LED matrix or photoluminescent matrix or even the need for previous processing of the video information by means of analog/digital or digital/analog converters, without the need for microprocessors, digital memories, shift registers or even computers and converters which are normally needed so that images could be generated on a pixel matrix. Likewise resolution would not be conditioned to a pre determined number, those matrixes would turn to work as an analog monitor thus greatly improving the image quality with a considerable reduction of cost. For a better understanding of the "MATRIX ANALOG SYSTEM FOR THE REPRODUCTION OF IMAGES" follows a description with reference to he annexed drawings.

BRIEF DESCRIPTION OF THE DRAWINGS

Drawing 1 shows a general view of the matrix controlled by two devices of sequential distribution.

Drawing 2 shows an enlarged view of a pixel with an analog memory for working appliances like LED's, lamps and others.

Figure 1:
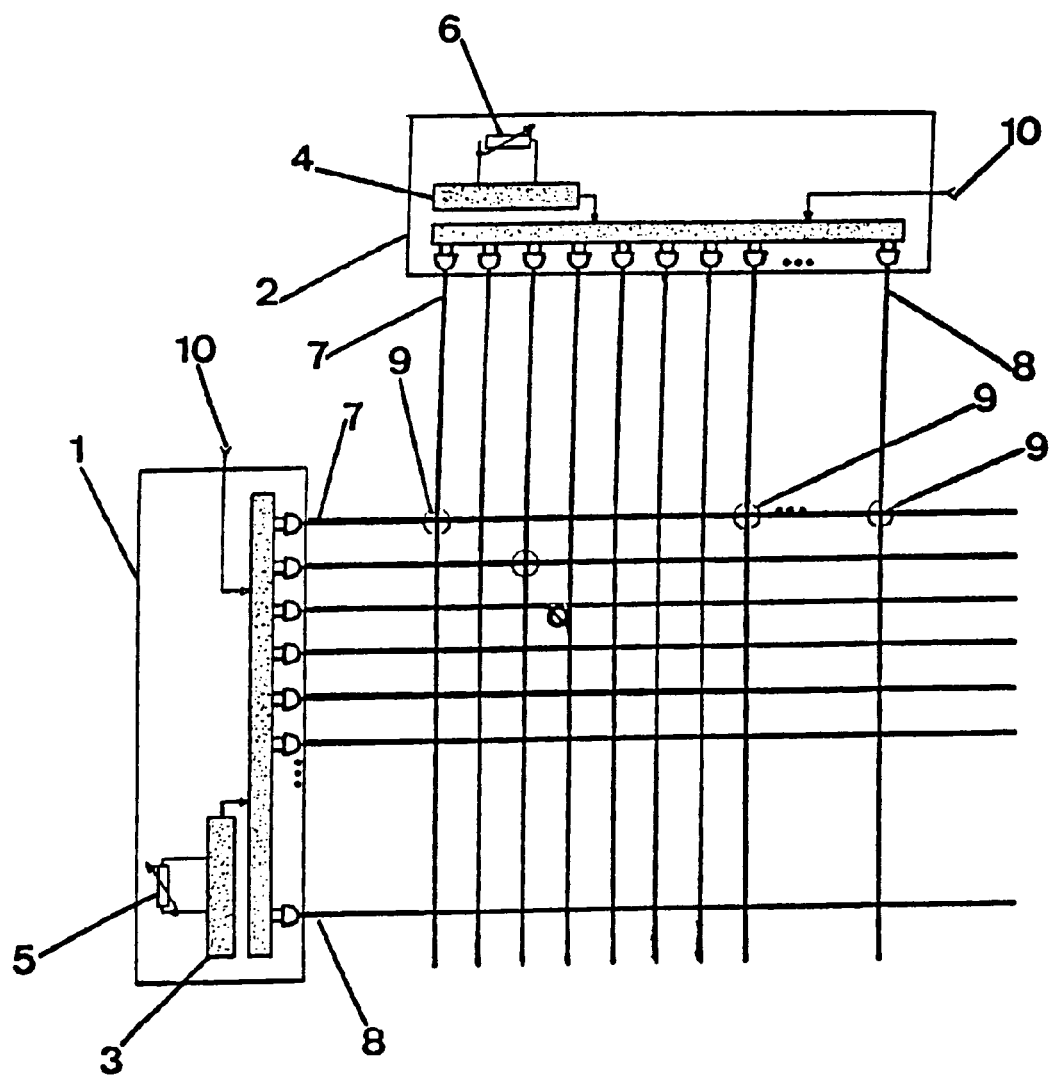
Figure 2:
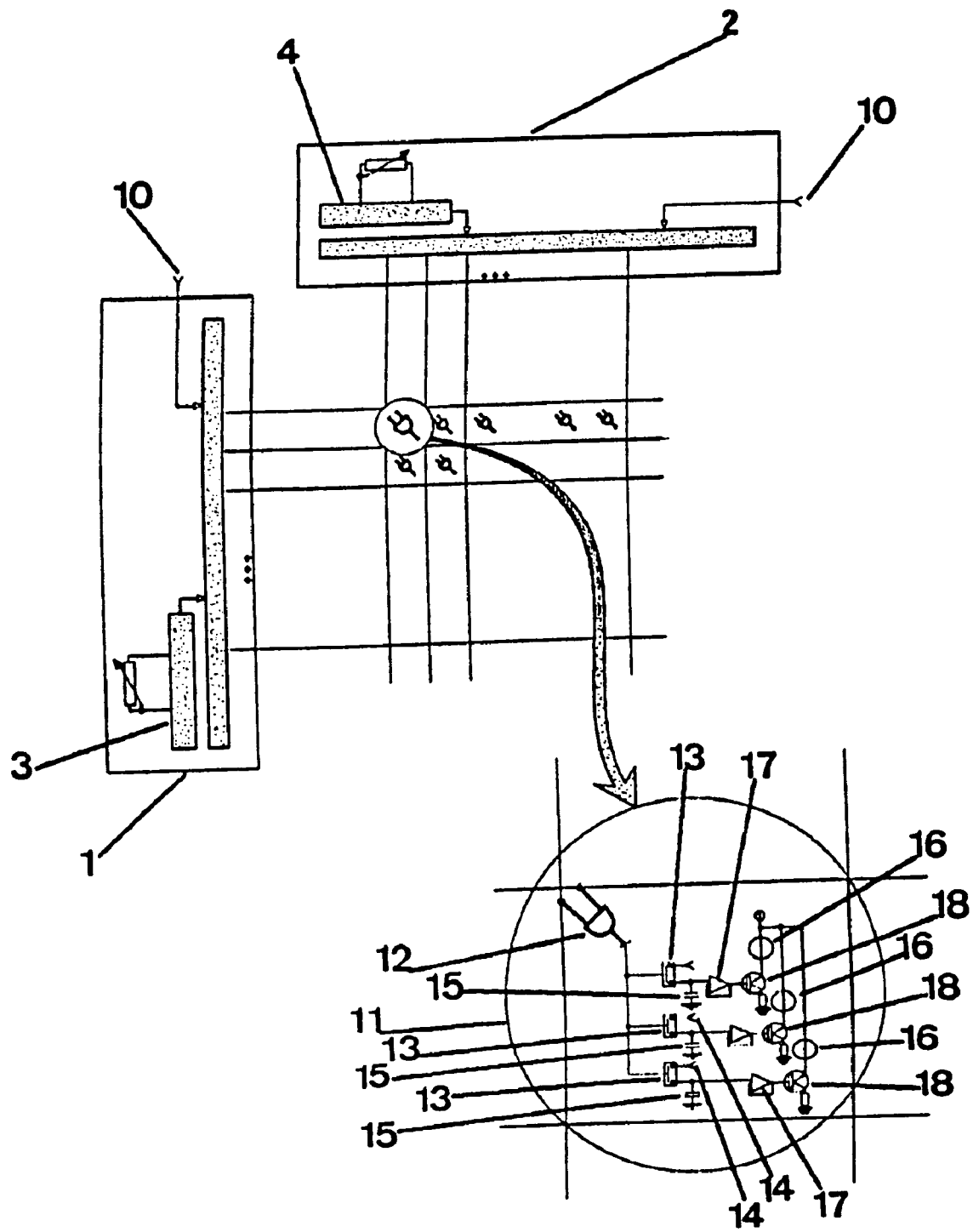
Figure 3:
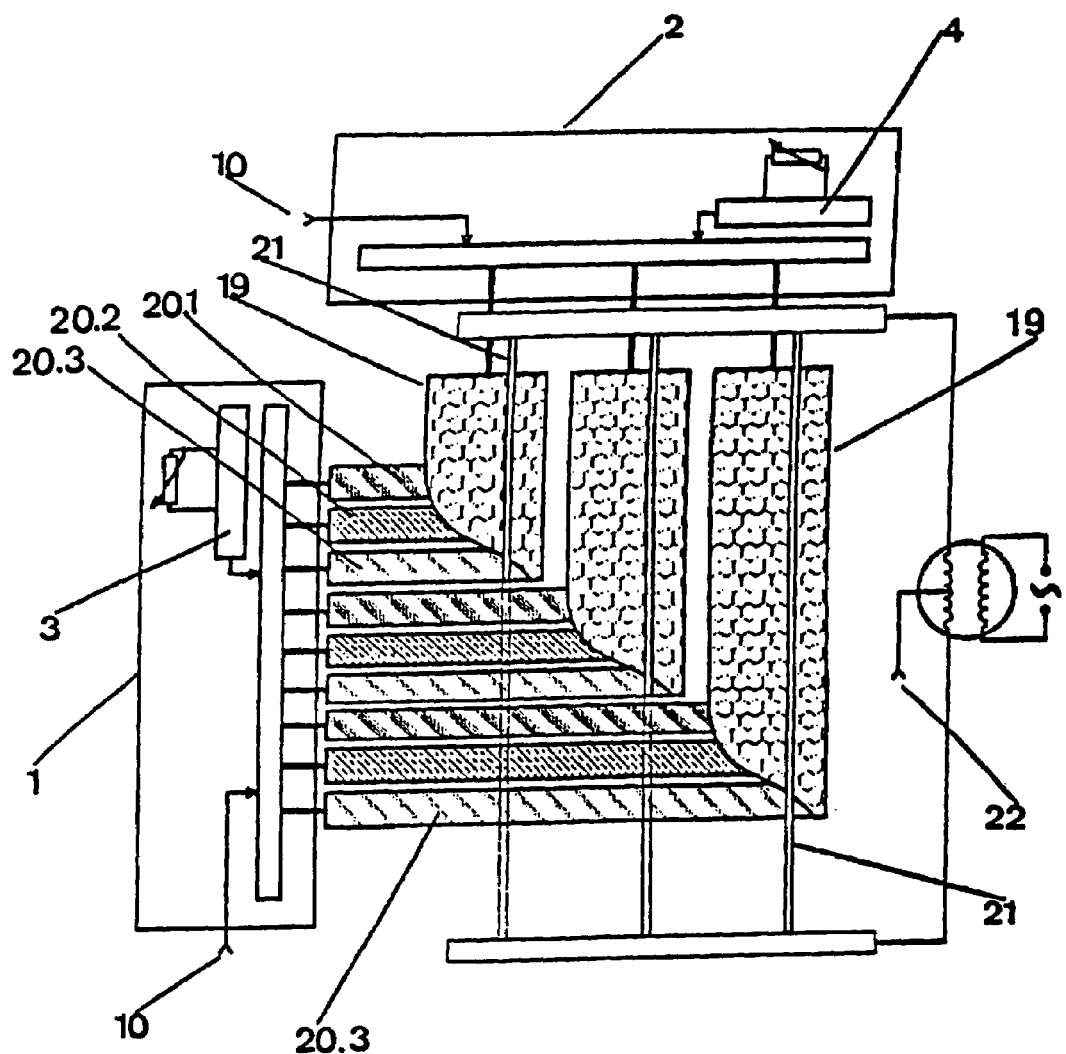

Drawing 3 shows the arrangement of a system for the assembly of polychromatic pixels onto a photoluminescent appliance.

DETAILED DESCRIPTION

The system consists of two sequential devices, one is vertical for the connection to the matrix vertical line (1) and another one for horizontal is connection of the matrix column (2). Each of the sequential distribution devices has got its own oscillator, one for the vertical connection (3) and one for the vertical connection (4) which according to its adjustment, vertical (5) or horizontal (6) determine the height and width of the matrix image. The sequential distribution device has got sequential outputs from $S_1$ (7) to $S_n$ (8) where n determines the maximum and only the maximum of the matrix column or line for the authorisation connection of the pixels (9). These sequential devices (1) and (2) may be built with dedicated components, transistors, passive element, logical ports and so on. For best image resolution the oscillator frequency (3) of the sequential device (1) that commands the matrix lines must be equal to the vertical frequency of the source video signal multiplied by the number of pixels of the matrix column, likewise the oscillator frequency (4) to the sequential device (2) that controls the matrix columns must be given by the horizontal frequency of he video signal multiplied by the number of pixels of the matrix line; to be remarked that it is not established a logical connection between the line command and the column command (characteristic of the digital system). This characteristic that initially does not establishes any logic to predetermine which pixel (9) will be authorised at a given moment and for how long, is the one that allows the reproduction of an analog video signal without needing to digitise it or even define previously the number of pixels to be used on the matrix.

The synchronism pulses found in the video signal, vertical and horizontal ones, will be applied onto the sequential device input (10) always in a way as to reset the sequential devices.

With the "MATRIX ANALOG SYSTEM FOR THE REPRODUCTION OF IMAGES" it is possible to add or deduct pixels (9) to or from the matrix line without compromising the functionality of the device, because as it has already been mentioned, the height and the width of the image is not predetermined like in the matrix digital systems, but determined at any given time by the variation of the frequency of the oscillator contained in each sequential distribution device, (3) and (4) in the same way as it is adjusted the height and width of the image on television sets or monitors whenever it is convenient. Consequently with this system video the image is displayed with any number of pixels (9), even with 4 pixels on the matrix and still the image will be reproduced so that each pixel will correspond to ¼ of the image, it is obvious that the greater the number of pixels being authorised on the matrix the greater will be the resolution.

Because of the characteristic of the sequential distribution device of having only one active output at any given time, while the others await their activation time, there will be only one authorised pixel on the matrix at any given time, because for such pixel to be authorised it needs the activation of the line and column simultaneously, in this way the maximum time in which each pixel remains disabled will be given by the equation: Maximum disabled time =1/Pulse frequency of vertical synchronism of the video signal, thus to visualise the image on the matrix each pixel (9) must have the capacity of staying bright for the pre-determined time instructed by the video signal present at the moment of authorisation of each pixel and such pixel must maintain its brightness during the period in which it is disabled, as it happens with cathodic rays tubes and on photoluminescent displays where the phosphorus performs the part of maintaining the brightness. When using light emitting devices that do not have the capacity of maintaining the brightness independently, without being authorised, such as LED's, incandescent lamp e similar ones, it is necessary the use of an analog memorisation electronic device (11) connected to a driver to control the above mentioned light emitters.

The analog memorisation electronic device (11) takes advantage of a logical port (12) of the kind AND with two inputs, connected with the crossing of the matrix column and line. This way the pixel will only be authorised when the respective line and column are active. As a result the output of the AND port will activate one or more electronic switches (13), depending if the pixel is dichromatic or polychromatic. The electronic switch (13) has the function of permitting the connection of the video signal ready at the switches (14) during the moment of the authorisation of the pixel so that this same video signal be stored under the form of tension into a capacitor (15). After the disabling of the pixel and the release of the electronic switch (13), the capacitor (15) memorised analogically the voltage of the video signal present at the moment of authorisation and keeps such voltage up to the next authorisation of the pixel, when again through the electronic switch (13) the video signal determines or not a new voltage for the capacitor (15). For the light emitter (16) to be activated using the voltage memorised by the capacitor (15), it is utilised an operational amplifier (17) configured as follower and not as a unitary gain voltage inverter with high input impedance and low output impedance which purpose is to activate the base of a transistor driver (18) that controls the light emitter (16) or a set of these according to the capacitor voltage. It is obvious that for a dichromatic or polychromatic pixel it is also necessary to increase the number of electronic switches (13), capacitors (15), operational amplifiers (17), transistors (18) and so on, considering that the switches (13), one for each colour video signal, must be activated by the same port (12), type AND, that authorises the pixel.

For an application with a photoluminescent device, it would be possible to build a matrix where the lines are grid strips (19) and the columns are anode strips covered by photoluminescent material (20), once the cathode (21) that may be hot or cold, it is utilised for the direct application of the video signal onto the input (22) which is always present by means of a transformer with central derivation, in the case of hot cathode, and that has the function of heating up the filament emitting so the electrons against the photoluminescent material deposited onto the anode, needed for light emission, this happens only when the grid and the anodes overlap and are polarised by positive voltage and this may occur only once on each of the matrix points, which are determined by the sequential distribution devices mentioned before that have their active outputs positively polarised, these outputs are polarised by negative voltage which in turn repels the electrons of the cathode. The two extra sequences of grids added, in turn vertical and horizontal, are placed as matrix, one on top of the other at angle of 90° (ninety degrees).

For a monochromatic version the anode shall be coated with only one kind of phosphorous corresponding to the desired colour. The polarisation of the grids is provided by the sequential distribution devices. The first sequence of grids is controlled by the vertical distribution device while the other sequence is controlled by the horizontal distribution device thus defining a unique crossing of the polarised grids at one time. The anodes are all time polarised by an independent tension produced by the sequential distribution devices and that have as objective to obtain a greater acceleration of the electrons that may pass through the vertical and horizontal grids, against the phosphorous, obtaining so a higher brightness proportionally to the polarising tension. The video signal is applied directly to the cathode which maybe hot or cold.

For a colour version of the "MATRIX ANALOG SYSTEM FOR THE REPRODUCTION OF IMAGES" using a photoluminescent matrix, it is necessary that the matrix had its anode strips covered with photoluminescent material for the emission of different colours and that the pixel be triple once the grid strip (19) is common to the whole pixel but the anode strip (20) is divided in 3 and each subdivision of the strip has to emit one of the 3 primary colours of the light spectrum one strip emits the red light (20.1), another one emits the green colour (20.2) and another one the blue light (20.3), thus the polychromatic pixel reproduces combined the colours and hues of visible spectrum in the same as in the cathodic ray kinescopes. As there is a unique cathode (21) for the connection of the video signal and we actually have three kinds of video signals, one for the red signal, one for the green one and one for the blue one, it becomes necessary a control system to co-ordinate each kind of video signal in a way so that this has access to the cathode when the sequential device that controls the anode strips (1) authorises the anode strip of the corresponding colour. Such control may be performed with a third sequential device as this device has only 3 outputs from a1 to a3, and that utilises the same oscillator (3) of the sequential device (1) that controls the anode strips. As a result this outputs (a1), (a2) and (a3) control 3 electronic switches for the video signal, one for each colour. With the addition of the two sequences of grids, namely the vertical and the horizontal one, considering a polychromatic version, the second sequence of grid is subdivided into three smaller grids which are as thick as the phosphorus that covers the anode strips which are overlaid; the connections of the sequential devices instead of being attached to the anode strips are now attached to these grid strips. The anode strips that are now connected all together, receive a fixed tension.

What is claimed is:

1. A matrix analog system for the reproduction of images, with sequential devices, built with dedicated components, transistors, passive elements, logic ports, for the control of two-dimensions matrices to activate light emitting pixels, characterized by an analog pixel matrix command accomplished through two independent sequential distribution devices, controlling by means of its outputs the authorization of a non predetermined number of pixels, these devices have an input that allow for the synchronization of the image through the synchronizing pulse, present in the video signal and in a way to permit through an internal oscillator in each sequential device, dynamic control of image resolution by control of the sweeping speed of the lines and columns of the matrix.

2. The matrix analog system for the reproduction of images, in accordance to claim 1, characterized for presenting a system dispositions for the construction of polychromatic pixels on photoluminescent device with unique grid pixels and triple anode, in a way that each anode has the characteristic of emitting light with one of the three primary colors of the visible spectrum (red, green, blue) and with a parallel filament cathode for the video signal.

3. The matrix analog system for the reproduction of images, in accordance with claim 1, characterized for presenting a system for utilizing analog memory and drive for the control of pixels that do not present the characteristic of emitting light while not powered, on matrices.

4. The matrix analog system for the reproduction of images, according to claim 2, featuring the addition of one more sequence of grids constructing the matrix with the already existing grid and the connection of all anode strips in common or a unique anode or the application of a higher fixed voltage and on this anode the layering of phosphorus in its monochromatic or polychromatic version, being the two grid sequences, vertical and horizontal, disposed as the matrix, laid one on top of the other at an angle of 90° (ninety degrees).

5. The matrix analog system for there production of images, according to claim 2, featuring as variation on the monochrome version, the anode covered by only one kind of phosphorus corresponding to the desired color, the polarization of the grids is performed by the sequential distribution devices, being the first sequence of grids controlled by the vertical sequential distribution device and the other by the horizontal sequential distribution device, presenting only one crossing of the polarized grids at a given time, the anodes are always polarized by an independent tension produced by the sequential distribution devices for a higher acceleration of the electrons passing at the vertical and horizontal grids against the phosphorus, obtaining thus a brighter emission of light, as greater as the polarizing tension itself, the video signal is applied on the cathode which may be cold or hot.

6. The matrix analog system for the reproduction of images, according to claim 2, featuring as variation on the monochrome version a second sequence of grids, each one subdivided into three smaller grids as thick as the phosphorus strips that cover the anode, the strips are overlaid and the connection of the sequential devices instead of being applied to the anodes strips are now applied to these grid strips, the anode strips which are now connected all together receive a fixed tension.

\* \* \* \* \*

UNITED STATES PATENT AND TRADEMARK OFFICE
CERTIFICATE OF CORRECTION

| | | |
|---|---|---|
| PATENT NO. | : 6,954,189 B1 | Page 1 of 1 |
| APPLICATION NO. | : 09/762876 | |
| DATED | : October 11, 2005 | |
| INVENTOR(S) | : Nereu Gouvea et al. | |

It is certified that error appears in the above-identified patent and that said Letters Patent is hereby corrected as shown below:

Column 2, Line 50, delete "pre determined", insert --pre-determined--

Column 2, Line 43, delete "I would", insert --It would--

Column 2, Line 56, delete "to he annexed", insert --to the annexed--

Column 3, Line 23, delete "of he video", insert --of the video--

Column 3, Lines 24 and 25
  delete "to be remarked that it is not established a logical connection between",
  insert --to be remarked that a logical connection is not established between--

Column 3, Line 27, delete "does not establishes", insert --does not establish--

Column 3, Lines 45 and 46
  delete "in the same way as it is adjusted the height and width of the image on television sets",
  insert --in the same way as the height and width of the image is adjusted on television sets--

Column 4, Line 6, delete "lamp e similar", insert --lamp and similar--

Column 5, Line 7, delete "maybe", insert --may be--

Column 5, Line 31 delete "this outputs", insert --these outputs--

Signed and Sealed this

Twenty-fourth Day of April, 2007

JON W. DUDAS
*Director of the United States Patent and Trademark Office*